United States Patent
Bisgaard et al.

(10) Patent No.: US 12,111,243 B2
(45) Date of Patent: Oct. 8, 2024

(54) HYDRODYNAMIC FOCUSING DEVICE

(71) Applicant: Foss Analytical A/S, Hilleroed (DK)

(72) Inventors: Christer Zoffmann Bisgaard, Hilleroed (DK); Anders Brask, Hilleroed (DK); Miguel Carro Temboury, Hilleroed (DK)

(73) Assignee: FOSS Analytical A/S, Hilleroed (DK)

( * ) Notice: Subject to any disclaimer, the term of this patent is extended or adjusted under 35 U.S.C. 154(b) by 241 days.

(21) Appl. No.: 17/779,344

(22) PCT Filed: Dec. 1, 2020

(86) PCT No.: PCT/IB2020/061305
§ 371 (c)(1),
(2) Date: May 24, 2022

(87) PCT Pub. No.: WO2021/144635
PCT Pub. Date: Jul. 22, 2021

(65) Prior Publication Data
US 2023/0003630 A1   Jan. 5, 2023

(30) Foreign Application Priority Data
Jan. 14, 2020   (DK) .............................. PA202000022

(51) Int. Cl.
*G01N 15/1404*   (2024.01)
*G01N 15/1434*   (2024.01)

(52) U.S. Cl.
CPC ..... *G01N 15/1404* (2013.01); *G01N 15/1436* (2013.01); *G01N 2015/1413* (2013.01)

(58) Field of Classification Search
CPC ........... G01N 15/1404; G01N 15/1436; G01N 2015/1413
See application file for complete search history.

(56) References Cited

U.S. PATENT DOCUMENTS 5,007,732 A * 4/1991 Ohki .................. G01N 15/1404
356/73
5,808,737 A    9/1998 Edens et al.
(Continued)

FOREIGN PATENT DOCUMENTS

EP    0288029 A2    10/1988
EP    1281059 A2    2/2003
(Continued)

OTHER PUBLICATIONS

Dannish Search Report For Dannish Patent Application No. PA202000022 dated Mar. 30, 2020.
(Continued)

*Primary Examiner* — Edmond C Lau
*Assistant Examiner* — Joshua M Carlson
(74) *Attorney, Agent, or Firm* — Harness, Dickey & Pierce, P.L.C.

(57) ABSTRACT

A hydrodynamic focusing device comprises first and second flow channels; a wall at least partially defining an envelopment region connected in-line between the first and second flow channels which collectively define a flow direction extending therethrough; and a chimney comprising a body and a sample fluid inlet, extending from the wall and into the envelopment region. The sample fluid inlet faces at least partially perpendicular to the flow direction in the envelopment region, such that the sample fluid inlet is configured to supply a sample fluid into the envelopment region in a direction that is at least partially perpendicular to the flow direction. The body and the sample fluid inlet each have an elongate profile which has a rounded leading edge facing the first flow channel and opposing long edges connecting the leading and trailing edges and tapered towards the trailing edge.

11 Claims, 4 Drawing Sheets

(56) References Cited

U.S. PATENT DOCUMENTS

| | | |
|---|---|---|
| 9,784,644 B2 | 10/2017 | Chen et al. |
| 9,784,664 B2 * | 10/2017 | Sadri .................... B01L 3/0265 |
| 2003/0044853 A1 | 3/2003 | Socks et al. |
| 2009/0178716 A1 * | 7/2009 | Kaduchak .......... G01N 15/1404 |
| | | 222/196 |
| 2011/0008767 A1 | 1/2011 | Durack |
| 2016/0332162 A1 | 11/2016 | Shinoda et al. |

FOREIGN PATENT DOCUMENTS

| | | |
|---|---|---|
| NL | 2026383 B1 | 4/2022 |
| WO | WO-0169203 A2 | 9/2001 |
| WO | WO-2019/121836 A1 | 6/2019 |

OTHER PUBLICATIONS

International Search Report for International Application No. PCT/IB2020/061305 dated Mar. 2, 2021.

Written Opinion for International Application No. PCT/IB2020/061305 dated Mar. 2, 2021.

Goranovic et al. Three-Dimensional Single Step Flow Sheathing in Micro Cell Sorters. In: Modeling and Simulation of Microsystems, 2001, ISBN: 0-9708275-0-4. Fabrication-section; figure 8.

\* cited by examiner

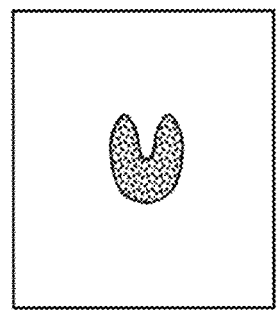
Fig. 3C
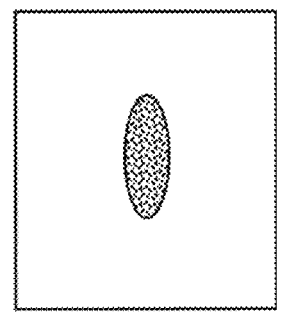
Fig. 3B
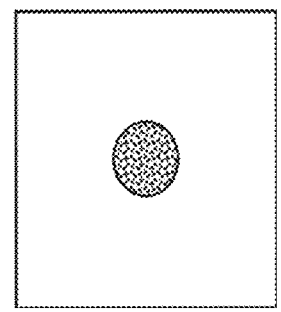
Fig. 3A
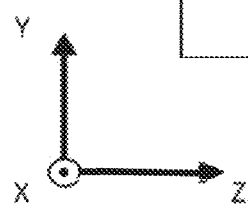

HYDRODYNAMIC FOCUSING DEVICE

CROSS-REFERENCE TO RELATED APPLICATIONS

This application is a National Stage of PCT/IB2020/061305, filed on Dec. 1, 2020, which claims priority to Danish Patent Application PA202000022, filed on Jan. 14, 2020 in the Danish Patent and Trademark Office, the entire contents of each of which are incorporated herein in their entirety.

BACKGROUND

The present invention relates to a hydrodynamic focusing device.

The need to analyse, sort or otherwise handle single particles in a flowing sample fluid often requires that the sample fluid be focused into a precise, uniform, flow. Such focusing is typically achieved by using a sheath fluid to surround and spatially compress the sample fluid into an extremely thin and precisely spatially located stream. A hydrodynamic focusing device typically consists of two main components: a first channel comprising an envelopment region, and a second channel, typically the channel in which measurements on the sample fluid are performed. A sheath fluid is flowed in the first channel whose purpose is to envelop and focus a second, sample, fluid flow which is introduced into the sheath fluid via a sample fluid inlet at the envelopment region. This second sample fluid typically contains artificial or biological particles to be measured.

The volumetric sheath fluid flow is magnitudes larger than the volumetric sample fluid flow—typical by a factor of 30. The sheath fluid flow is introduced in the first channel and is used to focus the sample fluid flow into the second channel. The second channel has a smaller cross-section compared to the first channel and is typically in the region of 0.2×0.2 mm. This allows for a laser or other known measurement modality to interrogate the sample particles, which are now flowed in the sample liquid in a single file, at a measurement region of the second channel.

In order to achieve an effective focusing of the sample fluid, it is important to position the inlet of the sample fluid flow in such a way that the sample fluid becomes completely enveloped by the flowing sheath fluid. The classic method for solving this problem is to introduce the sample fluid flow via a needle inlet positioned co-axially with the sheath fluid flow in an envelopment region of the first channel. This method can, however, be prone to clogging depending on needle dimensions. It also requires very precise alignment between mechanical parts. Moreover, from an economic point of view, it is desirable to use manufacturing methods such as injection molding, additive manufacture or lithography to produce such a device. However, it is very difficult to produce a geometry with the previously mentioned methods that allow the sample fluid inlet to be completely surrounded by the sheath fluid flow.

A hydrodynamic focusing device which addresses the problems associated with the classic method is described in EP 1281059. This hydrodynamic focusing device employs a stub, or 'chimney', inlet for the sample fluid which protrudes into an envelopment region of the first channel perpendicular to the flow direction of the sheath fluid so that the 'plume' of sample fluid from the chimney will migrate downstream towards the second channel as the sheath fluid flows.

An advantage of using the chimney design is mostly related to manufacturing because the design has no negative slip angles, that is to say, no overhanging structures. This enables a multitude of cost-effective manufacturing techniques, for example, injection molding, additive manufacture or lithography. However, the chimney itself introduces a significant disturbance in the sheath flow. This, in turn, will have a negative effect on the shape of the focused sample fluid at the measurement region. The main cause of the disturbance is the wake effect downstream of the chimney. Flow conditions in the wake region will tend to widen and distort the plume from the inlet chimney which will have a negative effect on the measurement quality due to differences in, for example, sample fluid velocities, measurement laser illumination intensity, and optical focus.

An alternative hydrodynamic focusing device has been developed which is disclosed in U.S. Pat. No. 9,784,664. This device basically replaces the chimney of the device described in EP 1281059 with a specifically shaped island in which the sample fluid inlet is formed. The island is shaped such that the wake effect associated with the known chimney is reduced. The device generally comprises a microfluidic chip in which are formed the first channel for carrying a sheath liquid; a diamond-shaped chamber in-line with the first channel to form the envelopment region; a central diamond-shaped island projecting into and positioned concentrically with the chamber, the island having smaller lateral and vertical dimensions than the chamber so that sheath fluid can flow from the channel, through the chamber, around the lateral sides of the island and over the top surface of the island; a sample fluid inlet through the island which terminates at its top surface; and the second channel for receiving the sheath fluid and the enveloped, focused, sample liquid from the chamber and having a smaller cross-section than the first channel. Any sample fluid that is introduced into the microfluidic device through the sample fluid inlet is thus carried downstream along the top surface of the island, which forms a barrier below the sample fluid, and is confined laterally by the sheath fluid. As the sample fluid flows horizontally off the top surface of the island a portion of the sheath fluid that has flowed around the island constrains the sample fluid from below and the sample fluid becomes hydrodynamically focused.

However, depending on flow conditions, there is a risk that the sample fluid flow may smear out over the surface of the island and distort in an unpredictable manner. Moreover, particles in the sample fluid may become trapped at the surface of the island, which again may lead to unpredictable flow characteristics of the sample fluid.

SUMMARY

According to a first aspect of the present invention, there is provided a hydrodynamic focusing device comprising a first flow channel; a second flow channel dimensioned with a smaller cross-section than that of the first flow channel; an envelopment region connected in-line between the first and the second flow channels; and a chimney comprising a body and a sample fluid inlet, the body extending from a wall of the envelopment region into the envelopment region and having smaller lateral and vertical dimensions than the envelopment region; wherein the body and the sample fluid inlet are each formed with an elongate profile having a leading edge facing the first flow channel and long edges opposing one another and relatively tapered towards a trailing edge.

The more hydrodynamically efficient shape of the chimney has an advantage that any wake effect may be suppressed. In some embodiments the chimney is constructed with a trailing edge angle (being the angle formed between the tangents to the long edges of the chimney at its trailing edge) of around 300° or less. With this construction it has been found that the wake effect may be essentially removed or, at least, measurably reduced.

As the extent of the chimney body in the direction of fluid flow through the envelopment region is insufficient to act as support for the sample fluid then smearing of the sample fluid and trapping of particles may be avoided.

In some embodiments the floor from which the chimney extends is sloped towards the second flow channel with the slope starting at a distance (upstream or downstream) from the center of the leading edge selected so as to cause the upward sheath flow to influence the morphology of the enveloped sample fluid. This distance is typically within 1.5 times, in some embodiments zero times, the height of the first flow channel at a location immediately upstream of the leading edge. This has an advantage that the morphology of the hydrodynamically focused sample fluid can be more easily adapted.

In some embodiments the first flow channel, the second flow channel and the envelopment region are formed as part of a substrate, such as a substrate of a microfluidic chip, in which is also formed a lens at a location in the substrate below a measurement region of the second flow channel, the lens being optically coupled to the measurement region through an optically transparent material portion of the substrate.

According to a second aspect of the present invention there is provided a method of hydrodynamically focussing a sample fluid using the hydrodynamic focussing device according to the first aspect of the present invention, the method comprising: (i) streaming a sheath fluid through the first flow channel into the envelopment region; (ii) introducing a sample fluid into the envelopment region through the sample fluid inlet of the chimney such that the sample fluid is hydrodynamically focussed by the sheath fluid as it leaves the chimney; and (iii) flowing the sheathed, hydrodynamically focussed, sample fluid out of the envelopment region and into the second flow channel.

Unless specifically stated otherwise, directions and dimensions will be referred to herein relative to the channels or other features being described and the flows within those channels or those other features. Thus "axial," "flow-wise," or "upstream/downstream" will refer to directions generally parallel to or in-line with fluid flow through a channel or other feature. The term "bottom" or "floor" will refer to a wall of a channel or other feature that is intended to be, in use, the lowest inner-surface of that chamber or feature (for example formed in a chip substrate). Likewise, "top" or "ceiling" will refer to a wall of a channel or other feature that is intended to be, in use, the highest inner-surface of that chamber or feature (for example a barrier formed by a layer applied over a chip substrate). The term "over" will refer to a direction generally away from a floor of the channel or other feature. Likewise, "lateral" or "horizontal" will refer to a direction generally toward or away from the sidewalls of a channel or other feature (not being the top or the bottom walls). Corresponding terms are to be interpreted in a similar fashion. In some descriptions, directions or dimensions may additionally or alternatively be referred to in terms of X, Y, and Z, which are mutually orthogonal directions with the X and Y directions lying in a plane parallel to the direction of fluid flow through the channel or other feature.

BRIEF DESCRIPTION OF THE DRAWINGS

An exemplary embodiment of the invention will now be explained in more detail with reference to the drawings in the accompanying figures, of which:

FIGS. 3A, 3B, and 3C Illustrate focusing patterns of sample fluid where (FIG. 3A) there is no wake effect; (FIG. 3B) customised using the slope of the floor of envelopment region; and (FIG. 3C) with a wake effect.

DETAILED DESCRIPTION

Figure 1:
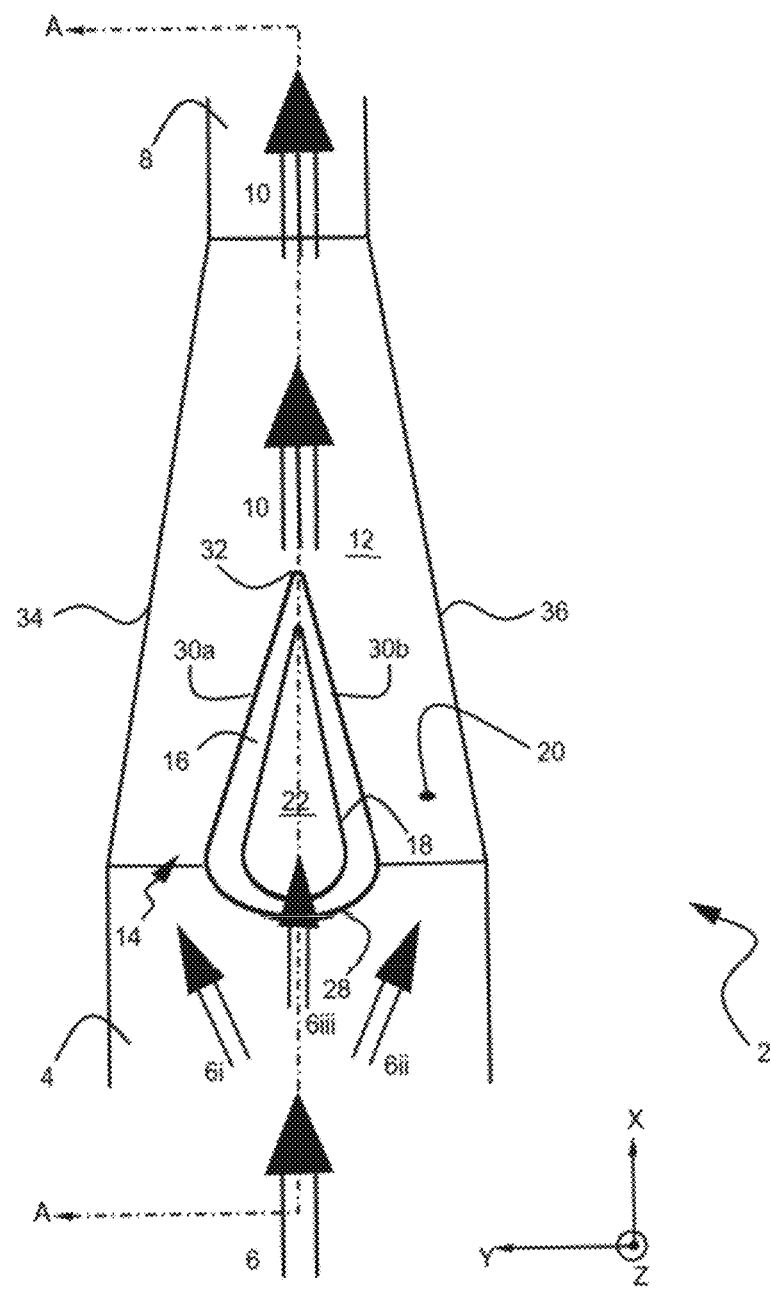
FIG. 1 shows a plan view of an embodiment of a hydrodynamic focusing device according to the present invention.
Figure 2:
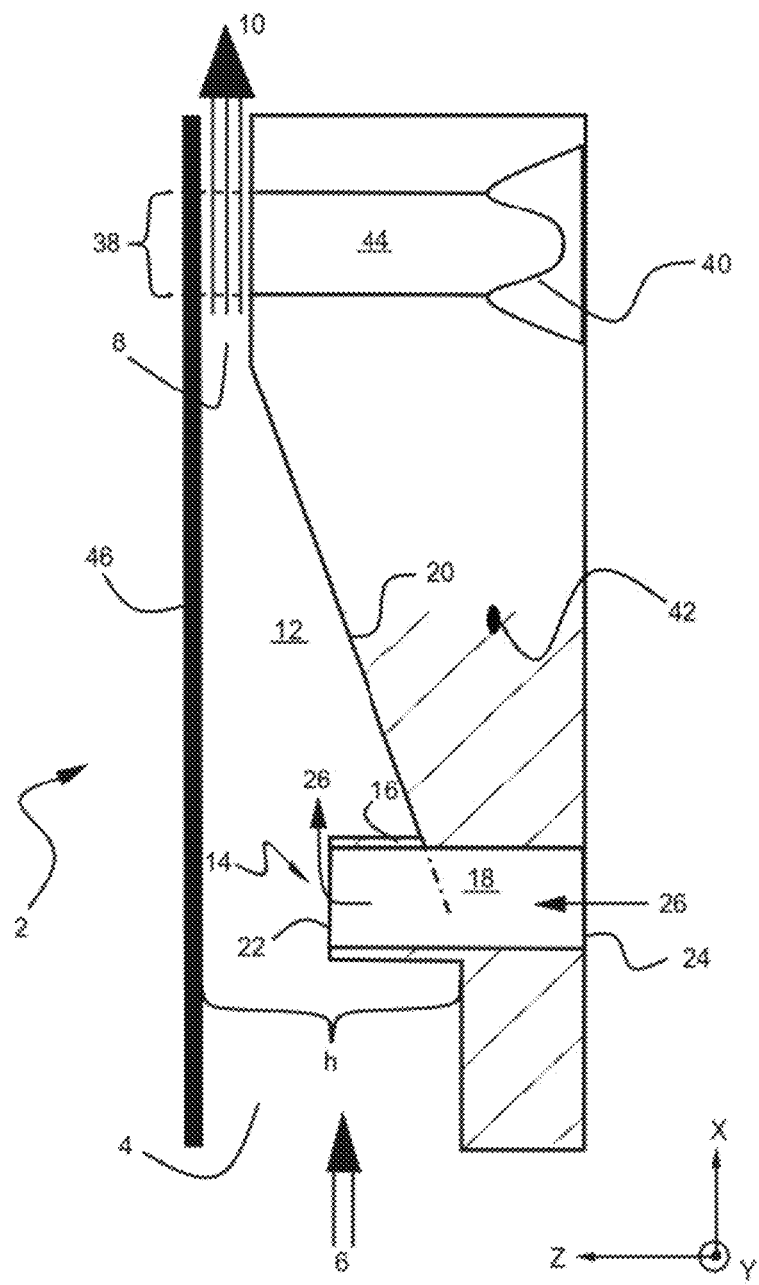
FIG. 2 shows a side elevation along A-A of the embodiment of a hydrodynamic focusing device illustrated in FIG. 1.

Considering now an example of a hydrodynamic focusing device 2 according to the present invention which is illustrated in FIG. 1 and FIG. 2. The hydrodynamic focusing device 2 here comprises a first flow channel 4 for a sheath fluid flow 6; a second flow channel 8 for a sheathed sample fluid flow 10; an envelopment region 12 connected in-line between the first 4 and the second 8 flow channels, here integral with the first flow channel 4; and a chimney 14 comprising a chimney body 16 and a sample fluid inlet 18 housed therein. The chimney body 16 extends from a wall (or floor) 20 of the envelopment region 12 and into the envelopment region 12 and is constructed with smaller lateral ('X' and 'Y') and vertical ('Z') dimensions than those of the envelopment region 12. The sample fluid inlet 18 terminates at a first end 22 within the envelopment region 12, here coincident with the end of the chimney body 16, and connects at an opposite end 24 to a sample fluid flow 26.

The chimney body 16 and the sample fluid inlet 18 are substantially concentric and together form the chimney 14 which has a generally elongate profile in the plane parallel to the general direction of fluid flow through the envelopment region 12 from the first flow channel 4 to the second flow channel 8. The chimney 14 of the present embodiment is provided with a rounded nose or 'leading edge' 28 and tapers along its generally opposing long edges 30a, 30b to form a narrower tail, or 'trailing edge' 32. In the embodiment illustrated in FIG. 1 and FIG. 2 the chimney body 16 and the sample fluid inlet 18 are both symmetric teardrop-shaped and extend from the floor 20, centrally between the opposing walls 34,36 of the envelopment region 12. This teardrop-shape is particularly hydrodynamically efficient but it will be appreciated that other hydrodynamically efficient shapes of the chimney 14 may be employed provided they conform to the general form described above. Moreover, in some embodiments one or both of the long edges 30a, 30b may be curved and in some embodiments the teardrop-shape is asymmetric. In some embodiments the chimney body may be angled relative to the vertical in a direction of the sheath fluid flow 6 from the first flow channel 4 towards the second flow channel 8. This provides a vector component of the sample fluid flow 26 in a direction of the sheath fluid flow 6 which facilitates the envelopment of this sample fluid flow 26.

As the sheath fluid flow 6 meets the leading edge 28 of the chimney 14 it is split by the leading edge 28 into a flow 6i, which passes around the chimney following a flow path between the long edge 30a of the chimney 14 and opposing wall 34 of the envelopment region 12; a flow 6ii which passes around the chimney following a flow path between the long edge 30b of the chimney 14 and opposing wall 36 of the envelopment region 12; and a flow 6iii following a flow path between the first end 22 of the sample fluid inlet 18 and a cover 46 (or ceiling) of the envelopment region 12 which is generally opposite the wall 20 (or floor) from which the chimney body 16 extends. The sheath fluid flows 6*i*, 6*ii* and 6*iii* recombine after the trailing edge 32 of the chimney 14. The sample fluid flow 26 exiting the sample fluid inlet 18 at the first end 22 of the sample fluid inlet 18 during the concurrent flow of sheath fluid flow 6 through the envelopment region 12 is, after the trailing edge 32, enveloped by the sheath fluid flow 6 to travel as a hydrodynamically focussed sheathed sample fluid flow 10 in a direction towards the second flow channel 8.

Figure 4:
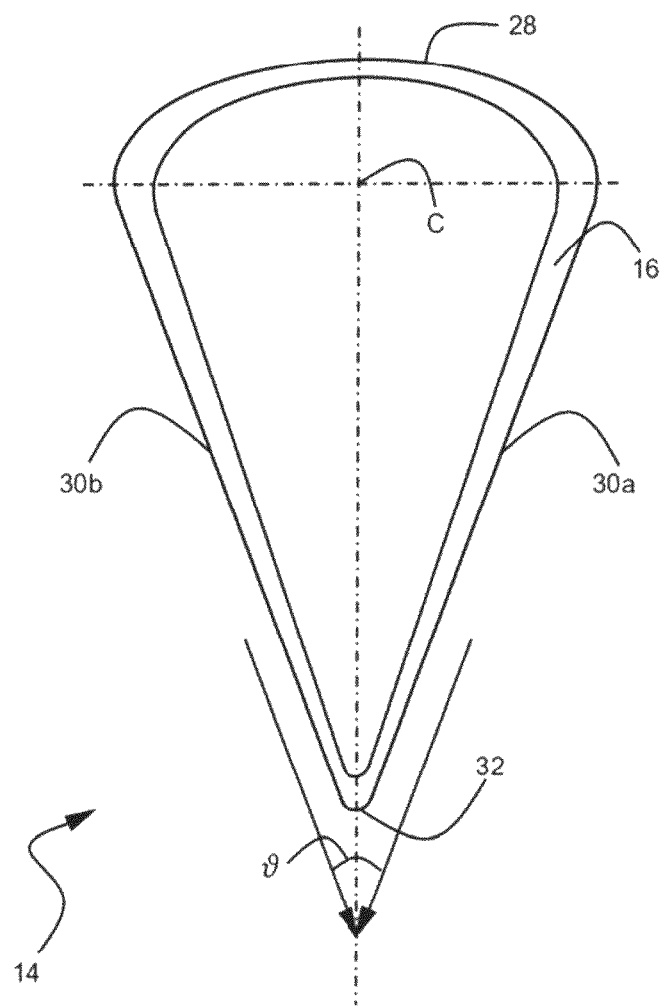
FIG. 4 Illustrates certain design aspects of the chimney of the device according to the present invention.

Any wake effect downstream of the chimney 14 will tend to widen and distort the plume of sample fluid exiting the sample fluid inlet 18 and negatively impact the shape of the hydrodynamically focussed sample fluid. This is illustrated in FIG. 3C for chimneys of known construction. By employing the more hydrodynamically efficient chimney shape of the present invention this wake effect may be suppressed. In particular, by configuring the chimney 14 with a trailing edge angle, $\vartheta$, less than around 30° (see FIG. 4) any wake effect, when present, may be essentially removed and a generally circular-shaped hydrodynamically focused sample stream may be generated, as is illustrated by FIG. 3A. As illustrated in FIG. 4, the trailing edge angle, $\vartheta$, is the angle formed between the tangents (broken line construction in the figure) to the respective long edges 30*a,b* of the chimney body 16 at its trailing edge 32. In the present embodiment, in which both long edges 30*a,b* are straight edges, the tangents will be parallel to these long edges 30*a,b*.

Usefully, the walls 34,36 of the envelopment region 12 which in part oppose the long edges 30*a*,30*b* of the chimney 14 are tapered towards the second flow channel 8 in order to assist with the positioning of the hydrodynamically focussed sample fluid flow 26 in relation to the second flow channel 8. The wall 20 from which the chimney body 16 extends may also be tapered i.e. sloped to assist with this positioning.

It has been found that it is especially useful if the start of the slope of the wall 20 is in close vicinity of the chimney 14 (see FIG. 4). When the slope of the wall 20 from which the chimney body 16 extends starts in this close vicinity it has been found that the upward sheath flow direction immediately after the trailing edge 32 will influence the morphology of the sheathed, hydrodynamically focused, sample fluid and may be employed in combination with the choice of shape of the chimney 14 to better tailor the morphology of the hydrodynamically focused sample fluid to suit the particular application. For example, in instances where particles in the sample fluid flow 26 are to be measured using a laser at a measurement region 38 of the second flow channel 8. Often, the illumination from the laser will have a narrow spatial intensity distribution in the direction ('Y' direction) perpendicular to the flow direction ('X' direction). By arranging slope of the floor 20 to start as described above the hydrodynamically focused sample fluid can be focussed with a relatively reduced dimension in the 'Y' direction as is illustrated in FIG. 3B. Using appropriate fluid dynamic simulation software such as, for example Siemens Star™ CCM+ or COMSOL Multiphysics™ software, the effects of varying the starting position of the slope relative to the chimney 14 can be readily modelled and its effects on the morphology of the hydrodynamically focussed sample fluid determined. In this manner it has been found that starting the slope at a distance from the center C of the leading edge 28 of the chimney 14 which is less than around three times, preferably within about 1.5 times, particularly less than 1 times, the height, h, of the first flow channel 4 immediately upstream of the leading edge 28 of the chimney 14 is particularly advantageous.

In some embodiments, a lens 40 may be provided integrally with the hydrodynamic focusing device 2. The lens 40 can be used as the primary focusing lens or as a secondary lens. The secondary lens is only used to improve light collection and requires a primary focusing lens (not illustrated) external to the hydrodynamic focusing device 2. Advantages of using the integral lens 40 as a primary lens include i) saving the cost of the external focusing lens and ii) improving light collection by cancelling refraction in air. The advantage of using the integral lens 40 as a secondary lens is the improvement in light collection by cancelling refraction in air while leaving the main lens design features to the external primary focusing lens. For the refraction to be cancelled when being used as a secondary lens, the lens 40 should have hemispheric shape, with the center approximately in the middle of the second flow channel 8. This is illustrated in FIG. 1 and FIG. 2. For both uses there is a further, common, advantage regarding optical alignment: this is facilitated since the distance between lens 40 and second flow channel 8 is permanently fixed.

Usefully, and as illustrated in the embodiment of FIG. 1 and FIG. 2, the hydrodynamic focusing device 2 may be formed on or in a substrate 42 of a microfluidic chip using conventional fabrication techniques often employed in semiconductor chip manufacturer, for example, injection molding, additive manufacture, micro-machining or lithography and a separate cover 46 applied. The lens 40 may then be formed as part of the substrate 42 directly below the measurement region 38. A portion of the substrate 44 between the measurement region 38 and the lens 40 is fabricated using an optically transparent material so that the lens 40 is thereby optically coupled to at least a section of the measurement region 38.

The invention claimed is:

1. A hydrodynamic focusing device, comprising:
a first flow channel;
a second flow channel dimensioned with a smaller cross-section than a cross-section of the first flow channel;
a wall that at least partially defines an envelopment region that is connected in-line between the first flow channel and the second flow channel, the first flow channel, the second flow channel, and the envelopment region collectively defining a flow direction extending through the first flow channel, through the envelopment region, and through the second flow channel; and
a chimney including a chimney body and a sample fluid inlet, the chimney body extending from the wall that at least partially defines the envelopment region into the envelopment region, the chimney body having smaller lateral and vertical dimensions than lateral and vertical dimensions of the envelopment region, the sample fluid inlet terminating at a first end within the envelopment region that is coincident with an end of the chimney body and faces at least partially perpendicular to the flow direction, such that the sample fluid inlet is configured to supply a sample fluid into the envelopment region in a direction that is at least partially perpendicular to the flow direction,
wherein the chimney body and the sample fluid inlet are concentric and together form the chimney and each have an elongate profile, the elongate profile having a rounded leading edge facing the first flow channel, an opposing trailing edge, and long edges connecting the rounded leading edge and the opposing trailing edge, the long edges being tapered towards the opposing trailing edge.

2. The hydrodynamic focusing device of claim 1, wherein the elongate profile of both the chimney body and the sample fluid inlet is teardrop-shaped so as to have a teardrop shape.

3. The hydrodynamic focusing device of claim 2, wherein the teardrop shape is a symmetrical teardrop shape.

4. The hydrodynamic focusing device of claim 1, wherein the chimney body has a trailing edge angle that is an angle formed between respective tangents to the long edges of the chimney at the opposing trailing edge, wherein the trailing edge angle is equal to or less than thirty degrees.

5. The hydrodynamic focusing device of claim 1, wherein the wall from which the chimney body extends has a slope that is sloped towards the second flow channel with the slope of the wall starting at a location relative to the chimney that is configured to generate a flow of a sheath fluid at least partially in a vertical direction towards the second flow channel in the envelopment region to influence a morphology of a sheathed, hydrodynamically focused, sample fluid flow, the vertical direction perpendicular to the flow direction.

6. The hydrodynamic focusing device of claim 5, wherein the slope of the wall that at least partially defines the envelopment region starts at a center of the rounded leading edge or at a distance from the center of the rounded leading edge, wherein the distance is less than three times a height of the first flow channel at a location immediately adjacent to the rounded leading edge.

7. The hydrodynamic focusing device of claim 6, wherein the slope of the wall starts at the center of the rounded leading edge.

8. The hydrodynamic focusing device of claim 5, wherein the slope of the wall is between the rounded leading edge of the chimney and the first flow channel.

9. The hydrodynamic focusing device of claim 1, wherein the first flow channel, the second flow channel, the envelopment region, and the chimney are part of a substrate, the substrate further including a lens at a location in the substrate that is below a measurement region of the second flow channel, the lens being optically coupled to the measurement region through an optically transparent material portion of the substrate.

10. The hydrodynamic focusing device of claim 1, wherein
the sample fluid inlet faces perpendicular to the flow direction, such that the sample fluid inlet is configured to supply the sample fluid into the envelopment region perpendicularly to the flow direction.

11. A method of hydrodynamically focusing a sample fluid using the hydrodynamic focusing device of claim 1, the method comprising:
streaming a sheath fluid flow through the first flow channel into the envelopment region along the flow direction;
introducing the sample fluid into the envelopment region at least partially perpendicular to the flow direction through the first end of the sample fluid inlet of the chimney located in the envelopment region such that the sample fluid is sheathed and hydrodynamically focused by the sheath fluid flow as the sample fluid leaves the chimney; and
flowing the sheathed, hydrodynamically focused, sample fluid out of the envelopment region and into the second flow channel.

* * * * *